US012794603B2

(12) United States Patent
Fan

(10) Patent No.: US 12,794,603 B2

(45) Date of Patent: Nov. 10, 2026

(54) DATA TRANSMISSION METHOD AND APPARATUS

(71) Applicant: HUAWEI TECHNOLOGIES CO., LTD., Shenzhen (CN)

(72) Inventor: Qiang Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 18/760,756

(22) Filed: Jul. 1, 2024

(65) Prior Publication Data

US 2024/0356684 A1 Oct. 24, 2024

Related U.S. Application Data

(63) Continuation of application No. PCT/CN2023/070016, filed on Jan. 3, 2023.

(30) Foreign Application Priority Data

Dec. 31, 2021 (CN) ......................... 202111670787.9

(51) Int. Cl.
*H04L 1/1867* (2023.01)
*H04L 1/1812* (2023.01)

(52) U.S. Cl.
CPC .......... *H04L 1/1887* (2013.01); *H04L 1/1816* (2013.01); *H04L 1/188* (2013.01)

(58) Field of Classification Search
CPC ..... H04L 1/1887; H04L 1/1816; H04L 1/188; H04L 1/1822; H04L 1/1861;
(Continued)

(56) References Cited

U.S. PATENT DOCUMENTS

2021/0014028 A1* 1/2021 You ....................... H04W 76/28
2021/0204256 A1* 7/2021 Xu ........................ H04W 48/12
(Continued)

FOREIGN PATENT DOCUMENTS

WO 2009045945 A2 4/2009
WO 2021032008 A1 2/2021
(Continued)

OTHER PUBLICATIONS

"3rd Generation Partnership Project; Technical Specification Group Services and System Aspects; Service requirements for cyber-physical control applications in vertical domains; Stage 1 (Release 17)," 3GPP TS 22.104 V17.7.0, Total 75 pages (Sep. 2021).

*Primary Examiner* — Habte Mered

(74) *Attorney, Agent, or Firm* — Leydig, Voit & Mayer, Ltd.

(57) ABSTRACT

Embodiments of this application provide a data transmission method and an apparatus. A terminal device sends a first data packet to an access network device on a first uplink resource. The terminal device starts a timer, and listens to feedback information from the access network device, where the feedback information is used to feed back whether the first data packet is successfully received. If the feedback information or retransmission scheduling information from the access network device is received during running of the timer, the terminal device stops the timer. If the timer expires, the terminal device sends first indication information to the access network device, where the first indication information indicates that uplink packet loss occurs in the access network device. According to the method, when starting to send a data packet of an aperiodic service or after sending the data packet, the terminal device starts a timer, and when the timer expires, sends indication information to the access network device to indicate that packet loss occurs,
(Continued)

to avoid interruption at an application layer caused by survival time timeout.

12 Claims, 6 Drawing Sheets

(58) Field of Classification Search
CPC ... H04L 1/1864; H04L 1/1893; H04L 1/1896; H04L 5/0055; H04W 24/02
See application file for complete search history.

(56) References Cited

U.S. PATENT DOCUMENTS

| | | | | |
|---|---|---|---|---|
| 2021/0337625 | A1* | 10/2021 | Tsai | H04W 56/001 |
| 2021/0410180 | A1* | 12/2021 | Tsai | H04W 72/1268 |
| 2022/0116988 | A1* | 4/2022 | Shi | H04L 1/1887 |
| 2022/0183075 | A1* | 6/2022 | Jiang | H04W 52/0216 |
| 2022/0210860 | A1* | 6/2022 | Chin | H04W 72/23 |
| 2022/0264631 | A1* | 8/2022 | Wang | H04L 1/188 |
| 2023/0261809 | A1* | 8/2023 | Jiang | H04L 1/189 370/329 |
| 2023/0276429 | A1* | 8/2023 | Miao | H04L 5/0053 370/329 |
| 2023/0344561 | A1* | 10/2023 | Guo | H04L 1/189 |

FOREIGN PATENT DOCUMENTS

| | | | |
|---|---|---|---|
| WO | 2021035535 | A1 | 3/2021 |
| WO | 2021206532 | A1 | 10/2021 |
| WO | 2021233401 | A1 | 11/2021 |

* cited by examiner

DATA TRANSMISSION METHOD AND APPARATUS

CROSS-REFERENCE TO RELATED APPLICATIONS

This application is a continuation of International Application No. PCT/CN2023/070016, filed on Jan. 3, 2023, which claims priority to Chinese Patent Application No. 202111670787.9, filed on Dec. 31, 2021. The disclosures of the aforementioned applications are hereby incorporated by reference in their entireties.

TECHNICAL FIELD

Embodiments of this application relate to the wireless communication field, and in particular, to a data transmission method and an apparatus.

BACKGROUND

In an industrial control scenario, a wired industrial internet of things (IIoT) is usually deployed to control a production line. For example, a wired time sensitive network (TSN) is deployed to control a production line. However, this method has some inherent disadvantages, for example, high cable deployment costs, security risks, and low flexibility. To resolve the foregoing disadvantages, the 3rd Generation Partnership Project (3GPP) proposes a solution of applying a 5G system (5GS) to a TSN. The 5GS is applied to the TSN as a TSN bridge device. A data packet of the TSN may be transmitted through the 5GS.

SUMMARY

This application provides a data transmission method and an apparatus, to improve reliability of data transmission.

According to a first aspect, this application provides a data transmission method, and the method is performed by a terminal device. The terminal device sends a first data packet to an access network device on a first uplink resource. The terminal device starts a timer, and listens to feedback information from the access network device, where the feedback information is used to feed back whether the first data packet is successfully received. If the feedback information or retransmission scheduling information from the access network device is received during running of the timer, the terminal device stops the timer. If the timer expires, the terminal device sends first indication information to the access network device, where the first indication information indicates that uplink packet loss occurs in the access network device.

According to the method described in the first aspect, when the terminal device transmits a service data packet, especially a data packet of an aperiodic service, when starting to send the data packet of the aperiodic service or after sending the data packet, the terminal device starts a timer, and when the timer expires, sends indication information to the access network device to indicate that packet loss occurs. In this way, the access network device can adjust a transmission manner to improve reliability of subsequent transmission, and avoid interruption at an application layer caused by survival time timeout.

In a possible implementation of the first aspect, before starting the timer, the terminal device determines whether the first data packet includes data of a first data radio bearer (DRB), where when transmitting a data packet of the first DRB, the terminal device needs to start the timer and listen to the feedback information.

According to the method, the access network device can perform differentiated configuration for different DRBs, so that reliability and resource utilization can be effectively balanced.

In a possible implementation of the first aspect, the first uplink resource is a configuration grant (CG) or a dynamic grant (DG).

In a possible implementation of the first aspect, the feedback information includes one or more of CG information, hybrid automatic repeat request (HARQ) process information, and DRB information.

In a possible implementation of the first aspect, the first indication information includes one or more of CG information, hybrid automatic repeat request HARQ process information, and DRB information.

In a possible implementation of the first aspect, the first indication information is carried in uplink control information (UCI), and a resource carrying the UCI is a physical uplink control channel (PUCCH) resource associated with the first uplink resource.

In a possible implementation of the first aspect, if the timer expires, the terminal device activates a radio link control (RLC) entity corresponding to a second DRB to perform packet data convergence protocol (PDCP) replication transmission, where the second DRB is a DRB associated with the first uplink resource or a DRB associated with a CG to which the first uplink resource belongs.

In a possible implementation of the first aspect, the RLC entity corresponding to the second DRB is preconfigured.

In a possible implementation of the first aspect, duration of the timer is preconfigured; and duration of the timer is configured based on each DRB; duration of the timer is configured based on each logical channel; duration of the timer is configured based on each set of CGs; duration of the timer is configured based on each bandwidth part (BWP); duration of the timer is configured based on each serving cell; or duration of the timer is configured based on each terminal device.

According to a second aspect, this application provides a data transmission method, and the method is performed by an access network device. The access network device receives a first data packet from a terminal device on a first uplink resource. The access network device receives first indication information from the terminal device, where the first indication information indicates that uplink packet loss occurs in the access network device.

In a possible implementation of the second aspect, the first uplink resource is a configuration grant CG or a dynamic grant DG.

In a possible implementation of the second aspect, the first indication information includes one or more of CG information, hybrid automatic repeat request HARQ process information, and DRB information.

In a possible implementation of the second aspect, the first indication information is carried in uplink control information UCI, and a resource carrying the UCI is a physical uplink control channel PUCCH resource associated with the first uplink resource.

According to a third aspect, a communication apparatus is provided. The communication apparatus includes a functional module configured to implement the method according to the first aspect, any possible implementation of the first aspect, the second aspect, or any possible implementation of the second aspect.

According to a third aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to the first aspect, any possible implementation of the first aspect, the second aspect, or any possible implementation of the second aspect through a logic circuit or by executing code instructions.

According to a fourth aspect, a computer-readable storage medium is provided. The computer-readable storage medium stores a computer program or instructions. When the computer program or the instructions are executed, the method according to the first aspect, any possible implementation of the first aspect, the second aspect, or any possible implementation of the second aspect is implemented.

According to a fifth aspect, a computer program product including instructions is provided. When the instructions are run, the method according to the first aspect, any possible implementation of the first aspect, the second aspect, or any possible implementation of the second aspect is implemented.

According to a sixth aspect, a computer program is provided. The computer program includes code or instructions. When the code or the instructions are run, the method according to the first aspect, any possible implementation of the first aspect, the second aspect, or any possible implementation of the second aspect is implemented.

According to a seventh aspect, a chip system is provided. The chip system includes a processor, and may further include a memory, configured to implement at least one method described in the first aspect, any possible implementation of the first aspect, the second aspect, and any possible implementation of the second aspect. The chip system may include a chip, or may include the chip and another discrete component.

DESCRIPTION OF EMBODIMENTS

Technical solutions provided in embodiments of this application may be applied to various communication systems, for example, a long term evolution (LTE) system, a 5th generation (5G) mobile communication system, a Wi-Fi system, a future communication system, a system integrating a plurality of communication systems, or the like. This is not limited in embodiments of this application. 5G may also be referred to as new radio (NR).

The technical solutions provided in embodiments of this application may be applied to various communication scenarios, for example, may be applied to one or more of the following communication scenarios: enhanced mobile broadband (eMBB), ultra-reliable low-latency communication (URLLC), machine type communication (MTC), massive machine type communications (mMTC), device-to-device (D2D), vehicle to everything (V2X), vehicle to vehicle (V2V), internet of things (IoT), and the like.

In embodiments of this application, "/" may represent an "or" relationship between associated objects. For example, A/B may represent A or B. The term "and/or" may indicate that there are three relationships between the associated objects. For example, A and/or B may represent the following three cases: Only A exists, both A and B exist, and only B exists. A and B may be singular or plural. In embodiments of this application, terms such as "first" or "second" may be used to distinguish between technical features with same or similar function. The words such as "first" and "second" do not limit a quantity and an execution sequence, and the words such as "first" and "second" do not limit a definite difference. In embodiments of this application, terms such as "example" or "for example" are used to represent giving an example, an illustration, or a description. Any embodiment or design scheme described with "example" or "for example" should not be explained as being more preferred or having more advantages than another embodiment or design scheme. A word such as "example" or "for example" is used to present a related concept in a specific manner for ease of understanding.

Figure 1:
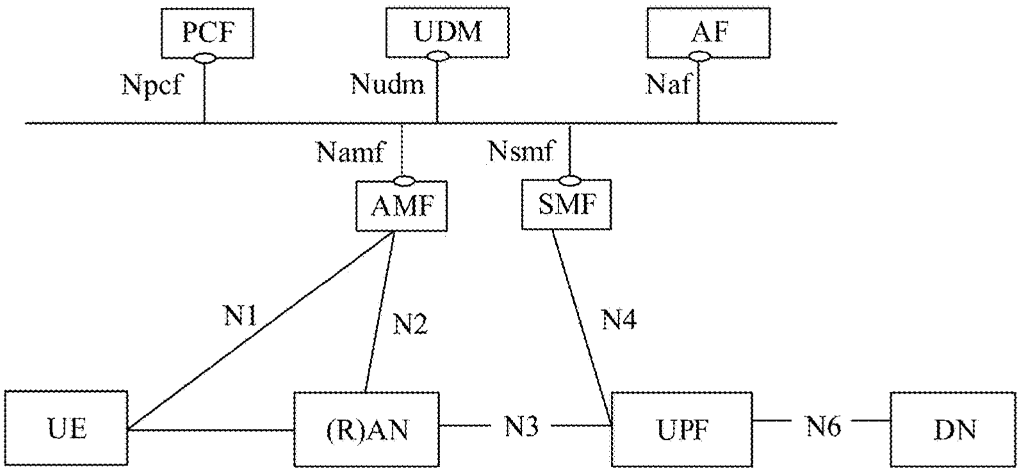
FIG. 1 is a diagram of a network architecture to which an embodiment of this application is applicable.

FIG. 1 is a diagram of a network architecture to which an embodiment of this application is applicable. As shown in FIG. 1, a terminal device may access a wireless network, to obtain services of external networks (for example, a data network (DN)) through the wireless network, or communicate with other devices through the wireless network, for example, communicate with another terminal device. Network elements in the wireless network include a radio access network (RAN) network element and a core network (CN) network element. The RAN is configured to connect the terminal device to the wireless network, and the CN is configured to manage the terminal device and provide a gateway for communicating with the DN. In embodiments of this application, a device in the RAN may be referred to as an access network device, and a device in the CN may be referred to as an access network device. Both the access network device and the access network device may be referred to as a network device.

The following separately describes in detail the terminal device, the RAN, the CN, and the DN in FIG. 1.

1. Terminal Device

The terminal device includes a device that provides voice and/or data connectivity for a user, and may include, for example, a handheld device with a wireless connection function or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) terminal device, a vehicle to everything (V2X) terminal device, a machine-to-machine/machine type communications (M2M/MTC) terminal device, an internet of things (IoT) terminal device, a subscriber unit, a subscriber station, a mobile station, a remote station, an access point (AP), a remote terminal, an access terminal, a user terminal, a user agent, user equipment, or the like. For example, the terminal device may include a mobile phone (or referred to as a "cellular" phone), a computer having a mobile terminal device, or a portable, pocket-sized, hand-held, or computer-embedded mobile apparatus. For example, it may be a device, for example, a personal communication service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

2. RAN Device

An RAN may include one or more RAN devices, and an interface between the RAN device and a terminal device may be a Uu interface (or referred to as an air interface). Certainly, in future communication, names of these interfaces may remain unchanged, or may be replaced by other names. This is not limited in this application.

The RAN device is an access device used by the terminal device to access a mobile communication system in a wireless manner, and may be a base station, an evolved NodeB (eNodeB), a transmission reception point (TRP), a next generation NodeB (gNB) in the 5G mobile communication system, a base station in a future mobile communication system, an access node in a Wi-Fi system, or the like. The RAN device may include a central unit (CU), or a distributed unit (DU), or include the CU and the DU.

In embodiments of this application, functions of the RAN device may alternatively be implemented by using a plurality of network functional entities, and each network functional entity is configured to implement some functions of the RAN device. These network functional entities may be network elements in hardware devices, or may be software functions that are run on dedicated hardware, or may be instantiated virtualization functions on a platform (for example, a cloud platform).

(1) Protocol Layer Structure

Communication between a RAN device and a terminal device is performed in accordance with a specific protocol layer structure. For example, a control plane protocol layer structure may include a radio resource control (RRC) layer, a packet data convergence protocol (PDCP) layer, a radio link control (RLC) layer, a media access control (MAC) layer, and a physical layer. A user plane protocol layer structure may include a PDCP layer, an RLC layer, a MAC layer, and a physical layer. In possible implementation, a service data adaptation protocol (SDAP) layer may be further included above the PDCP layer.

Data transmission between an access network device and the terminal device is used as an example. The data transmission needs to go through the user plane protocol layer, for example, the SDAP layer, the PDCP layer, the RLC layer, the MAC layer, and the physical layer. The SDAP layer, the PDCP layer, the RLC layer, the MAC layer, and the physical layer are also collectively referred to as an access stratum. For example, at least one data radio bearer (DRB) is established between the access network device and the terminal device for data transmission. Each DRB may correspond to a group of functional entity sets, for example, include one PDCP layer entity, at least one RLC layer entity corresponding to the PDCP layer entity, at least one MAC layer entity corresponding to the at least one RLC layer entity, and at least one physical layer entity corresponding to the at least one MAC layer entity. It should be noted that at least one signaling radio bearer (SRB) may also be established between the access network device and the terminal device for signaling transmission. The DRB and the SRB are collectively referred to as a radio bearer (RB).

Figure 2A:
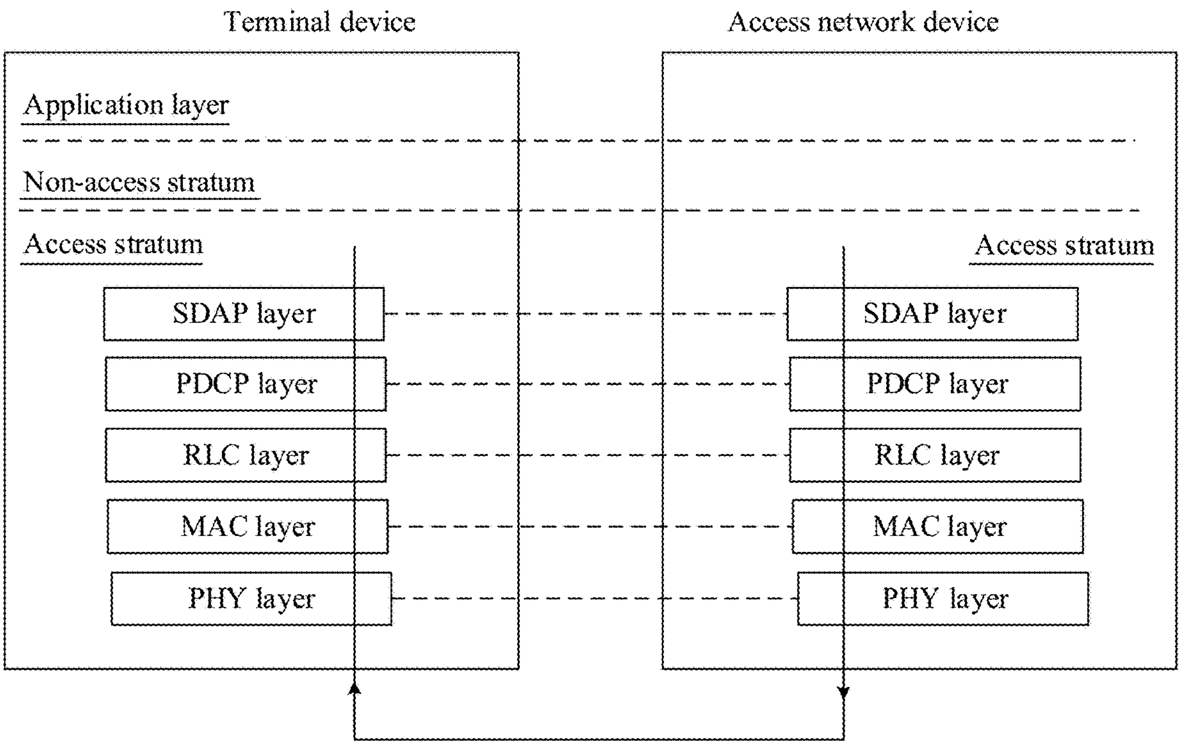
FIG. 2*a* is a diagram of an example of a protocol layer structure between a terminal device and an access network device according to an embodiment of this application.

Downlink data transmission is used as an example. In FIG. 2*a*, a downward arrow indicates data sending, and an upward arrow indicates data receiving. After obtaining data from an upper layer, an SDAP layer entity may map the data to a PDCP layer entity of a corresponding DRB based on a quality of service flow indicator (QoS flow indicator, QFI) of the data. The PDCP layer entity may transmit the data to at least one RLC layer entity corresponding to the PDCP layer entity, and then the at least one RLC layer entity transmits the data to a corresponding MAC layer entity. Then, the MAC layer entity generates a transport block, and a corresponding physical layer entity wirelessly transmits the transport block. The data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer entity from an upper layer is referred to as a PDCP SDU, and data sent by the PDCP layer entity to a lower layer is referred to as a PDCP PDU. Data received by the RLC layer entity from an upper layer is referred to as an RLC SDU, and data sent by the RLC layer entity to a lower layer is referred to as an RLC PDU. Data may be transmitted between different layers through a corresponding channel. For example, data may be transmitted between the RLC layer entity and the MAC layer entity through a logical channel (logical channel, LCH), and data may be transmitted between the MAC layer entity and the physical layer entity through a transport channel.

For example, it can be further learned from FIG. 2*a* that, the terminal device further has an application layer and a non-access stratum. The application layer may be configured to provide a service for an application installed on the terminal device. For example, downlink data received by the terminal device may be sequentially transmitted from the physical layer to the application layer, and then is provided by the application layer for the application. For another example, the application layer may obtain data generated by the application, sequentially transmit the data to the physical layer, and send the data to another communication apparatus. The non-access stratum may be configured to forward user data. For example, the non-access stratum forwards uplink data received from the application layer to the SDAP layer, or forwards downlink data received from the SDAP layer to the application layer.

(2) CU and DU

Figure 2B:
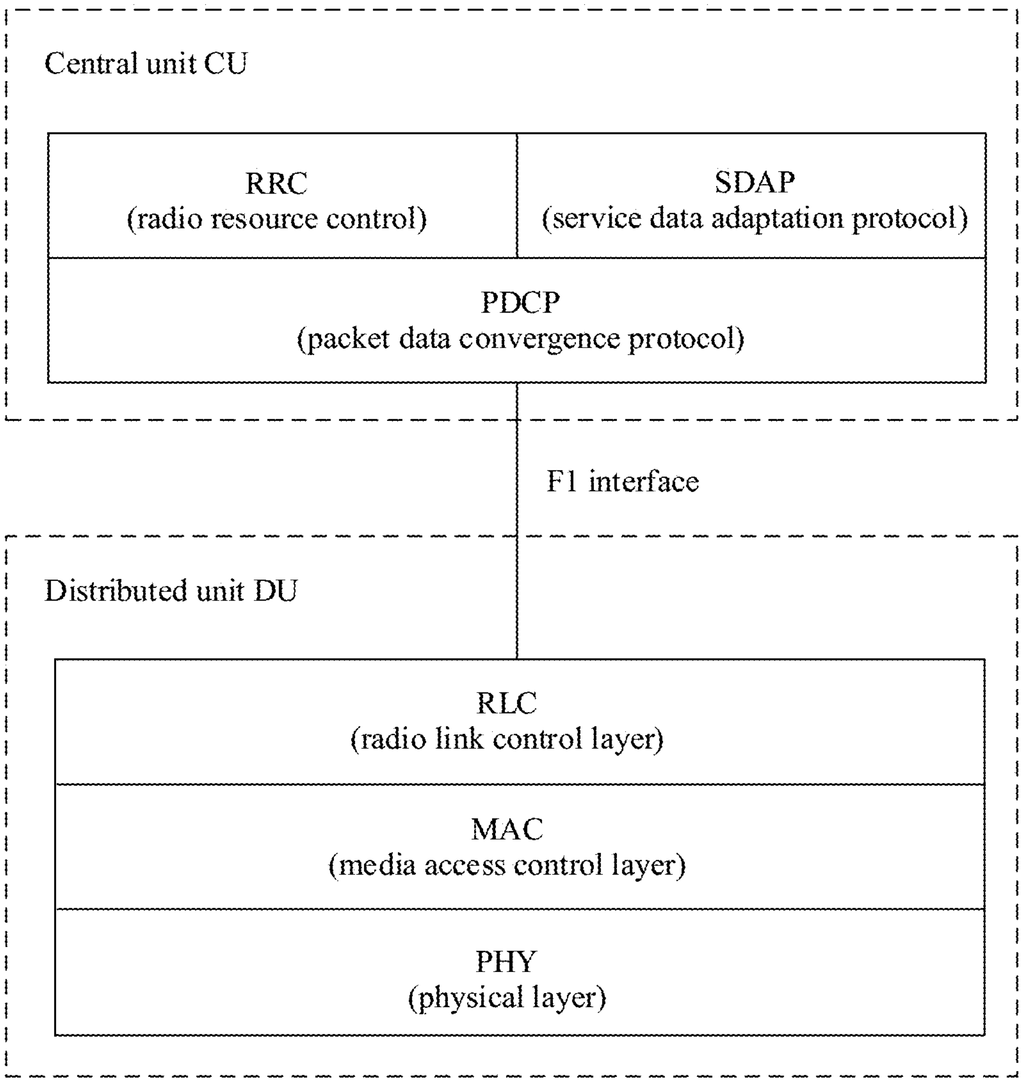
FIG. 2*b* is a diagram of a CU-DU split architecture according to an embodiment of this application.

In embodiments of this application, a RAN device may include one or more central units (CU) and one or more distributed units (DU), and a plurality of DUs may be centrally controlled by one CU. For example, an interface between the CU and the DU may be referred to as an F1 interface. A control plane (CP) interface may be an F1-C interface, and a user plane (UP) interface may be an F1-U interface. The CU and the DU may be classified based on protocol layers of a wireless network. For example, as shown in FIG. 2*b*, functions of a PDCP layer and a protocol layer above the PDCP layer are set on the CU, and a function of a protocol layer below the PDCP layer is set on the DU. For example, the DU may include an RLC layer, a MAC layer, and a physical (Physical, PHY) layer.

In a possible design, the DU may include a function of the RLC layer, a function of the MAC layer, and some functions of the PHY layer. For example, the DU may include a function of an upper layer in the PHY layer. The function of the upper layer in the PHY layer may include a cyclic redundancy check (CRC) function, channel coding, rate matching, scrambling, modulation, and layer mapping. Alternatively, the function of the upper layer in the PHY layer may include cyclic redundancy check, channel coding, rate matching, scrambling, modulation, layer mapping, and precoding. A function of a lower layer in the PHY layer may be implemented by another network entity independent of the DU. The function of the lower layer in the PHY layer may include precoding, resource mapping, physical antenna mapping, and radio frequency functions. Alternatively, the function of the lower layer in the PHY layer may include resource mapping, physical antenna mapping, and radio frequency functions. Function division of the upper layer and the lower layer in the PHY layer is not limited in embodiments of this application. When the function of the lower layer in the PHY layer may be implemented by another network entity independent of the DU, that the DU sends data or information to another communication apparatus (for example, a terminal device or a core network device) may be understood as: The DU performs functions of the RLC layer and the MAC layer, and some functions of the PHY layer. For example, after the DU completes the functions of the RLC layer and the MAC layer, and cyclic redundancy check, channel coding, rate matching, scrambling, modulation, and layer mapping, the network entity that is independent of the DU and that performs the function of the lower layer in the PHY layer performs remaining functions of mapping and sending on a physical resource.

3. CN

The CN may include one or more CN devices. A 5G communication system is used as an example. The CN may include an access and mobility management function (AMF) network element, a session management function (SMF) network element, a user plane function ( ) network element, a policy control function (PCF) network element, a unified data management (UDM) network element, an application function (AF) network element, a network exposure function (NEF) network element, a unified data repository (UDR) network element, and the like.

4. DN

The DN, also be referred to as a packet data network (PDN), is a network outside an operator network. The operator network may access a plurality of DNs. Application servers corresponding to a plurality of services may be deployed in the DN, to provide a plurality of possible services for a terminal device. An application layer corresponding to an application layer of the terminal device may be disposed in the application server.

In FIG. 1, Npcf, Nudm, Naf, Namf, Nsmf, N1, N2, N3, N4, and N6 are interface sequence numbers. For meanings of these interface sequence numbers, refer to meanings defined in related standard protocols. This is not limited herein.

It may be understood that a 5G communication system is used as an example in FIG. 1. The solutions in embodiments of this application may alternatively be applied to another possible communication system, for example, a future 6th generation (6G) communication system. The foregoing network elements or functions may be network elements in hardware devices, may be software functions that are run on dedicated hardware, or may be instantiated virtualization functions on a platform (for example, a cloud platform). Optionally, the network element or function may be implemented by one device, or may be jointly implemented by a plurality of devices, or may be a functional module in one device. This is not specifically limited in embodiments of this application.

Figure 2C:
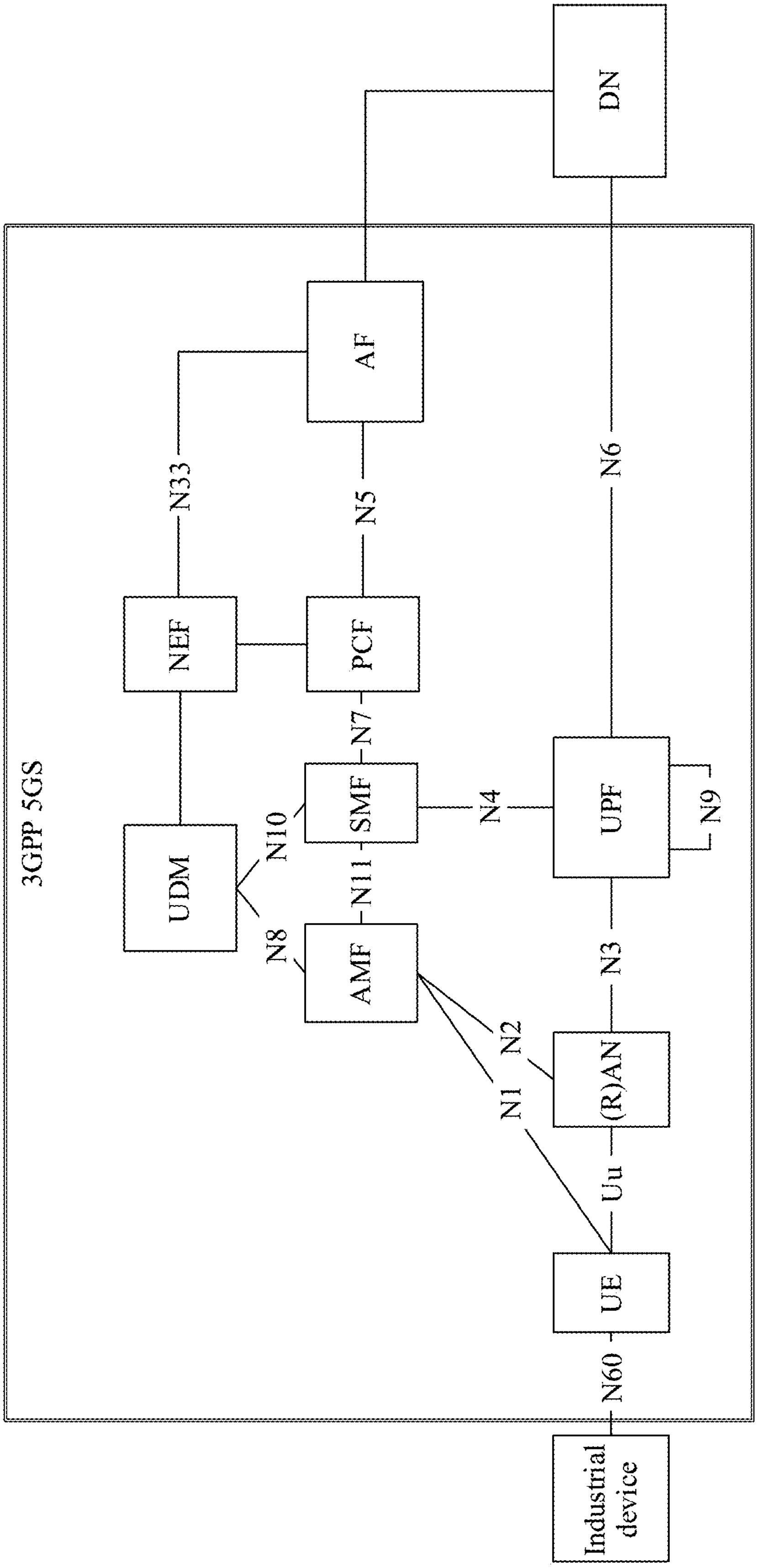
FIG. 2*c* is a diagram of an architecture of a 5G system supporting a TSN network according to an embodiment of this application.

FIG. 2*c* is a diagram of an architecture of a 5GS supporting a TSN network to which an embodiment of this application is applicable. As shown in FIG. 2*c*, the TSN network may consider the 5GS as a TSN bridge device, and data packets of various industrial applications may be sent in an uplink/downlink through the 5GS. Data of an industrial application may be sent by a DN (for example, a TSN controller) to a UPF, sent by the UPF to UE connected to an industrial device (for example, a sensor or an operation arm), and sent by the UE to the connected industrial device. Similarly, industrial data may also be sent to the DN by the industrial device. In the 5GS, data transmission is performed between the UE and a base station through a Uu interface, and data transmission is performed between the base station and a core network data plane UPF through an N3 interface/N3 tunnel. In a possible implementation, the TSN controller may be deployed on a network side, for example, a side connected to the UPF, or may be deployed on a user side, for example, a side connected to the UE.

The following explains and describes related technical features in embodiments of this application. It should be noted that these explanations are intended to make embodiments of this application easier to understand, but should not be considered as a limitation on the protection scope claimed in this application.

1. Survival Time Survival Time

A 5G communication system may support a plurality of possible services, for example, a URLLC service, and a 1 ms latency and 99.999% reliability need to be ensured. An IIoT service requires higher latency and reliability assurance, for example, 0.5 ms latency and 99.9999% reliability. To avoid great impact on an application layer caused by occasional communication errors at a network layer, survival time may be set at an application layer of an IIoT device. Survival time means that, if the application layer of the IIoT device does not receive a data packet within a time range in which the data packet is expected to arrive, a survival time timer is about to be started. If an expected data packet arrives at the application layer during running of the timer, the timer stops. If the timer runs until the timer expires, to be specific, if no expected data packet arrives at the application layer in a time period in which the survival time timer runs, interruption occurs at the application layer. When interruption occurs at the application layer, the application layer enters a predefined state, for example, service interruption or breakdown.

Figure 3:
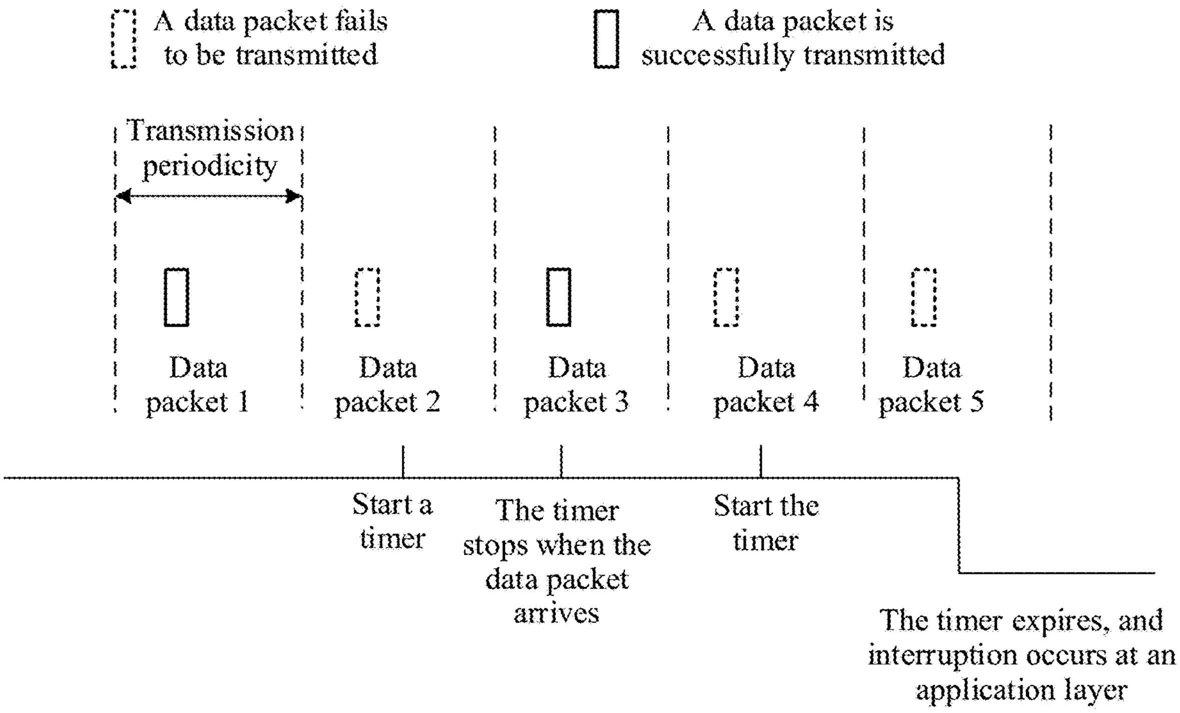
FIG. 3 shows an example of service interruption at an application layer according to an embodiment of this application.

For a service in which a data packet is periodically generated, in an example, the survival time may be defined as a quantity (for example, a) of consecutive data packets that fail to be transmitted. If the quantity of consecutive data packets that fail to be transmitted is greater than or equal to a, service interruption occurs at the application layer. For example, as shown in FIG. 3, one data packet may be transmitted in one transmission periodicity, and a is 2. In other words, when two consecutive data packets fail to be transmitted, service interruption occurs at the application layer. Specifically, as shown in 4, when a data packet 2 in FIG. 3 fails to be transmitted, a timer starts. When a data packet 3 in a next periodicity is successfully transmitted, the timer stops. When a data packet 4 in the next periodicity fails to be transmitted, the timer is started again. If a data packet 5 still fails to be transmitted, the timer expires, and interruption occurs at the application layer.

In another example, the survival time may also be defined as a quantity (for example, c) of consecutive transmission periodicities in which transmission fails. The transmission periodicity in which transmission fails may be a transmission periodicity in which a data packet fails to be transmitted, or a transmission periodicity in which a quantity of unsuccessfully transmitted data packets is greater than or equal to a first threshold, or a transmission periodicity in which an amount of unsuccessfully transmitted data is greater than or equal to a second threshold. The first threshold and the second threshold may be preset. If the quantity of consecutive transmission periodicities in which transmission fails is greater than or equal to c, service interruption occurs at the application layer.

2. Time Sensitive Communication Assistance Information

For a time sensitive service (for example, a TSC service), to avoid interruption at an application layer caused by survival time timeout of the service, an SMF may provide time sensitive communication assistance information ( ) of the service to an access network device when establishing a QoS flow. The TSCAI may describe a service feature of the time sensitive service used in a 5G system, to help the access network device perform effective resource scheduling. For example, the TSCAI may include survival time of the time sensitive service. After obtaining the TSCAI of the QoS flow, the access network device may determine survival time corresponding to the QoS flow in the TSCAI, and schedule the QoS flow based on the survival time. For example, for an uplink QoS flow, if uplink transmission packet loss occurs, the TSC service may enter the survival time. The access network device improves transmission reliability of a subsequent uplink data packet, to avoid continuous service packet loss, thereby avoiding interruption at an application layer caused by survival time timeout.

Optionally, the TSCAI may further include a flow direction of the QoS flow of the time sensitive service, for example, downlink or uplink. The TSCAI may further include a periodicity, indicating a time interval between two bursts of the time sensitive service. The TSCAI may further include burst arrival time (burst arrival time).

3. Configured Grant

An implementation in which a terminal device performs uplink data transmission with a network device may be grant-free transmission. To be specific, the terminal device sends uplink data to the network device through a grant-free resource. In the grant-free transmission, uplink transmission of the terminal device does not need to be completed through scheduling by the network device. For example, when the uplink data arrives, the terminal device does not need to send a scheduling request (SR) to the network device and wait for a dynamic grant (DG) of the network device, but may directly send the uplink data to the network device through an uplink transmission resource pre-allocated by the network device. The dynamically allocated uplink transmission resource may be referred to as a DG or DG resource. The pre-allocated uplink transmission resource may be referred to as a "configured grant (CG)", uplink configuration grant, or CG resource, and the resource is periodic.

For a periodic service, that is, a service whose data packet is always generated and arrives at a base station side in a determined periodicity, the access network device may configure a periodic CG resource for the terminal device to transmit service data. For example, if the access network device fails to decode a data packet on one CG resource, the access network device immediately schedules a retransmission resource for the terminal device when realizing that uplink packet loss occurs. After receiving retransmission scheduling, the terminal device may improve reliability of subsequent data packet transmission in a manner such as activating PDCP replication transmission, to avoid continuous packet loss.

However, for an aperiodic service, if the foregoing manner is used, the access network device cannot identify in a timely manner that packet loss occurs. For example, the access network device configures a periodic CG resource for the terminal device. However, because service data arrives at an application layer of the terminal device aperiodically, not all CG resources have data to be transmitted. In the conventional technology, when the CG resource arrives but the terminal device has no data to be transmitted, the terminal device actively ignores the CG resource. As a result, when the terminal device transmits an aperiodic service data packet through the CG resource, but the access network device fails to decode the data packet, the access network device does not realize that packet loss occurs because the access network device mistakenly considers that the terminal device has no data to be transmitted and ignores the CG resource. In this case, because the access network device does not realize that packet loss occurs, the access network device does not schedule a resource or adjust a transmission manner to improve reliability of subsequent transmission. Consequently, packet loss may still occur in a subsequently transmitted data packet, survival time timeout is caused, and therefore interruption occurs at the application layer.

In view of this, the present invention provides a data transmission method, to improve reliability of data transmission, especially reliability of data transmission of an aperiodic service.

Figure 4:
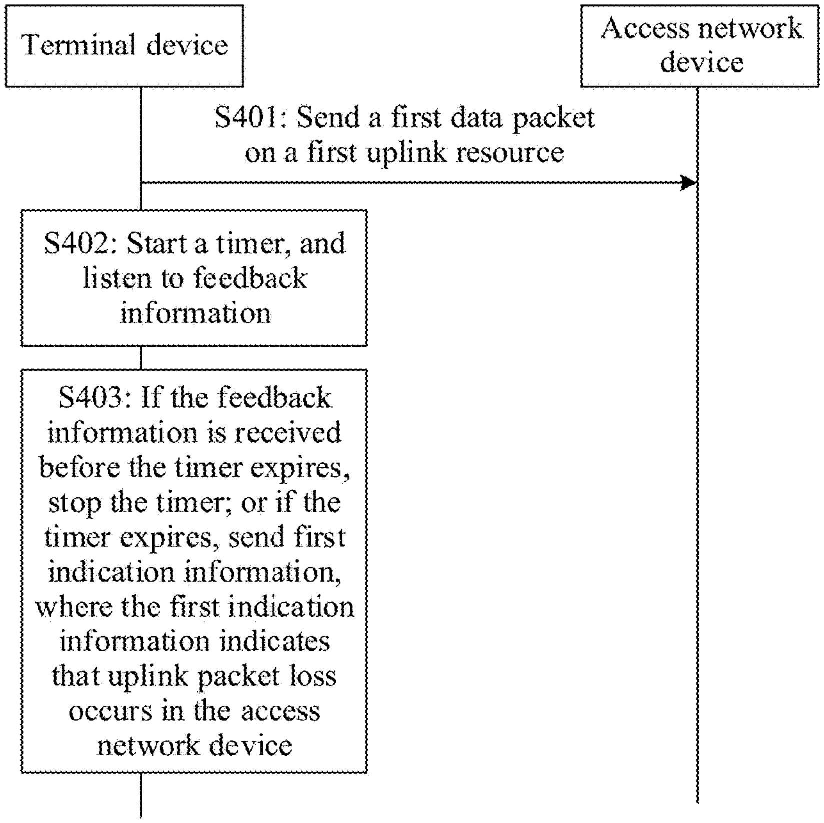
FIG. 4, FIG. 5, and FIG. 6 are schematic flowcharts of data transmission methods according to an embodiment of this application.

FIG. 4 is a schematic flowchart of a data transmission method according to an embodiment of this application. This embodiment relates to a specific process of data transmission between an access network device and a terminal device. This embodiment may be performed by the access network device and the terminal device, or may be performed by a module, for example, a chip, separately used in the access network device and the terminal device. The following provides description by using an example in which the method is performed by an access network device and a terminal device.

As shown in FIG. 4, the method may include S401, S402, and S403. An execution sequence of the steps is not limited in this embodiment of this application.

S401: A terminal device sends a first data packet to an access network device on a first uplink resource. Correspondingly, the access network device receives the first data packet from the terminal device on the first uplink resource. Optionally, the first uplink resource may be a CG resource, or may be a DG resource. The following uses an example in which the first uplink resource is the CG resource for description.

S402: The terminal device starts a timer, and listens to feedback information from the access network device. The feedback information is used to feed back whether the access network device successfully receives the first data packet.

Optionally, the terminal device may start the timer when transmission of the first data packet starts or after transmission of the first data packet is completed. Optionally, the timer is associated with a hybrid automatic repeat request (HARQ) process. For example, the terminal device sends the first data packet on the first uplink resource by using a HARQ process 1, and after sending the first data packet, the terminal device starts a timer associated with the HARQ process 1.

Optionally, duration of the timer may be preconfigured by the access network device, and a preconfiguration manner may specifically include but is not limited to the following manners.

In an optional manner 1, the access network device configures duration of the timer for each DRB. For example, the access network device configures duration of the timer in an information element for configuring the DRB. After sending the first data packet through the first uplink resource, the terminal device starts the timer. The duration of the timer may be determined based on duration of a timer corresponding to a DRB associated with the first data packet. Specifically, if the first uplink data includes data of one DRB (for example, a DRB 1), the duration of the timer is duration of a timer corresponding to the DRB 1. If the first uplink data includes data of a plurality of DRBs, the duration of the timer is a minimum value or a maximum value of duration of timers corresponding to the plurality of DRBs.

In another optional manner 2, the access network device configures duration of the timer for each LCH. For example, the access network device configures duration of the timer in an information element for configuring the LCH. After sending the first data packet through the first uplink resource, the terminal device starts the timer. The duration of the timer may be determined based on duration of a timer corresponding to an LCH associated with the first data packet. For example, if the first uplink data includes data of one LCH (for example, an LCH 1), the duration of the timer is duration of a timer corresponding to the LCH 1. If the first uplink data includes data of a plurality of LCHs, the duration of the timer is a minimum value or a maximum value of duration of timers corresponding to the plurality of LCHs.

In another optional manner 3, the access network device configures duration of the timer for each set of CGs. For example, the access network device configures duration of the timer in an information element for configuring the CG. After the terminal device sends the first data packet through the first uplink resource, the duration of the timer may be determined based on duration of a timer corresponding to a CG to which the first uplink resource belongs.

In still another optional manner 4, the access network device configures duration of the timer for each bandwidth part (BWP). For example, the access network device configures duration of the timer in an information element for configuring the BWP. After the terminal device sends the first data packet through the first uplink resource, the duration of the timer may be determined based on duration of a timer corresponding to a BWP to which the first uplink resource belongs. Optionally, a plurality of sets of CG resources may be configured for one BWP, and duration of timers corresponding to CG resources for which first functions are configured is the same. The first function may be understood as a function with reliability assurance. After performing data transmission through the CG resource on which the first function is configured, the terminal device needs to listen to feedback acknowledgment information of the access network device.

In still another optional manner 5, the access network device configures duration of the timer for each serving cell. For example, the access network device configures duration of the timer in an information element for configuring the serving cell. After the terminal device sends the first data packet through the first uplink resource, the duration of the timer may be determined based on duration of a timer corresponding to a serving cell to which the first uplink resource belongs. Optionally, a plurality of sets of CG resources may be configured for one serving cell, and duration of timers corresponding to CG resources for which first functions are configured is the same.

In still another optional manner 6, the access network device configures duration of the timer for each terminal device. For example, the access network device configures duration of the timer in a cell group configuration information element or a MAC entity configuration information element. Optionally, the access network device configures a plurality of sets of CG resources for the terminal device, and duration of timers corresponding to CG resources for which first functions are configured is the same.

Optionally, before starting the timer, the terminal device first determines whether the first data packet includes data of a first DRB. If the first data packet includes the data of the first DRB, the timer is started. The first DRB is a DRB for which the first function is configured.

S403: If the feedback information or retransmission scheduling information from the access network device is received during running of the timer, the terminal device stops the timer. For example, when receiving feedback information transmitted by the access network device for the HARQ process 1, or receiving scheduling retransmission information of the HARQ process 1, the terminal device stops the timer.

Optionally, the feedback information may be carried in downlink control information (DCI), or may be carried in a MAC control element (CE) or other signaling. This is not limited in this embodiment of this application.

Optionally, the feedback information may include one or more of CG information, HARQ process information, and DRB information. For example, the CG information may be a CG index value, the HARQ process information may be a HARQ process number, and the DRB information may be a DRB ID or a logical channel ID (LCH ID).

Optionally, the feedback information may include an acknowledgment (ACK) message or a negative acknowledgment (NACK), to indicate that the access network device successfully parses or fails to parse the first data packet. Optionally, the ACK/NACK information may be explicitly carried in the feedback information. For example, bits "0" and "1" are used to identify the ACK and the NACK respectively. Optionally, the ACK/NACK information may be implicitly carried. For example, when the terminal device receives the feedback information, namely, the ACK, it indicates that the first data packet is successfully received.

If the timer expires, the terminal device may actively improve reliability of data transmission. For example, the terminal device activates an RLC entity corresponding to a second DRB to perform PDCP replication transmission, or the terminal device activates an RLC entity preconfigured by the access network device for a second DRB to perform PDCP replication transmission. The second DRB is a DRB associated with the first uplink resource or a DRB associated with a CG to which the first uplink resource belongs.

If the timer expires, the terminal device may send first indication information to the access network device, where the first indication information indicates that uplink packet loss occurs in the access network device, or indicates that the timer of the access network device expires. Optionally, the indication information may carry one or more of CG information, HARQ process information, and DRB information.

For example, the CG information may be a CG index value, the HARQ process information may be a HARQ process number, and the DRB information may be a DRB ID or an LCH ID.

Optionally, the first indication information may be carried in uplink control information (UCI), or may be carried in a MAC CE or other signaling. This is not limited in this embodiment of this application. For example, when the first indication information is carried in the UCI, the access network device may associate a set of physical uplink control channel (PUCCH) resources with the CG to which the first uplink resource belongs, and the PUCCH resource is used to transmit the first indication information.

Optionally, the terminal device may also notify, based on the first indication information, the access network device that the terminal device has activated PDCP replication transmission. After receiving the first indication information, the access network device may allocate a transmission resource to a newly activated RLC entity in a timely manner for subsequent transmission.

A person skilled in the art should understand that when the timer expires, the terminal device may actively improve reliability of data transmission to ensure subsequent transmission. Alternatively, the terminal device may send the first indication information to the access network device to notify the access network device that packet loss occurs, to ensure subsequent transmission. Alternatively, the terminal device may actively improve reliability of data transmission and send the first indication information to the access network device, to ensure subsequent transmission. This is not limited in this embodiment of this application.

The foregoing embodiment provides the data transmission method. When the terminal device transmits the service data packet, especially the data packet of the aperiodic service, when starting to send the data packet of the aperiodic service or after sending the data packet, the terminal device starts the timer, and when the timer expires, sends the indication information to the access network device to indicate that packet loss occurs. In this way, the access network device can adjust a transmission manner to improve reliability of subsequent transmission, and avoid interruption at an application layer caused by survival time timeout.

Figure 5:
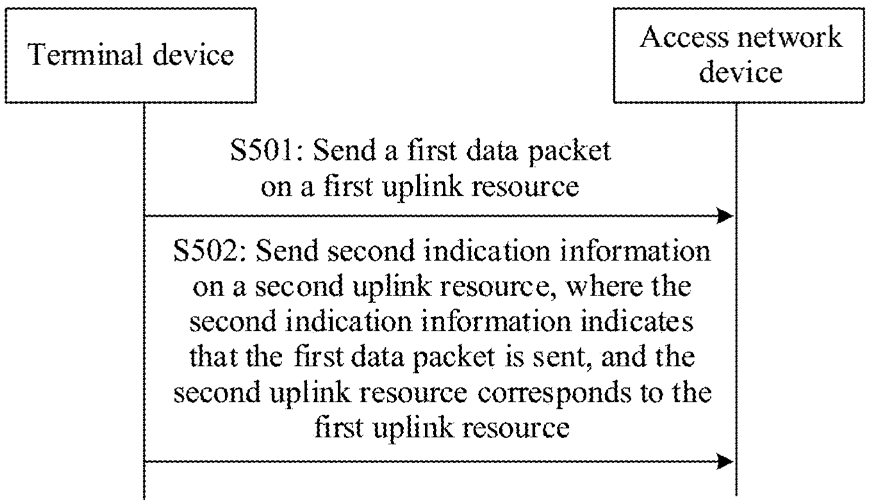

FIG. 5 is a schematic flowchart of a data transmission method according to an embodiment of this application. This embodiment relates to a specific process of data transmission between an access network device and a terminal device. This embodiment may be performed by the access network device and the terminal device, or may be performed by a module, for example, a chip, separately used in the access network device and the terminal device. The following provides description by using an example in which the method is performed by an access network device and a terminal device.

As shown in FIG. 5, the method may include S501 and S502. An execution sequence of the steps is not limited in this embodiment of this application.

S501: A terminal device sends a first data packet to an access network device on a first uplink resource. Correspondingly, the access network device receives the first data packet from the terminal device on the first uplink resource. Optionally, the first uplink resource is a CG resource. Optionally, the CG resource is used to transmit an aperiodic service.

S502: The terminal device sends second indication information to the access network device on a second uplink resource. Correspondingly, the access network device receives the second indication information from the terminal device on the second uplink resource. There is a correspondence between the first uplink resource and the second uplink resource, and the second uplink resource is a PUCCH resource. The second indication information indicates that an uplink data packet is transmitted on the first uplink resource.

In one CG periodicity, as long as the access network device successfully obtains, through parsing, at least one of the first data packet carried on the CG resource and a PUCCH signal corresponding to the first data packet, the access network device may determine that the terminal device performs transmission through the CG resource in the CG periodicity. In this case, if the access network device fails to decode the first data packet in the CG periodicity or does not receive the first data packet, the access network device considers that packet loss occurs in uplink transmission. In this case, the access network device may schedule a retransmission resource for the terminal device, and/or trigger the terminal device to improve reliability of subsequent data packet transmission.

It should be noted herein that the first uplink resource (CG resource) and the second uplink resource (PUCCH resource) always appear in each CG periodicity together. Optionally, the access network device preconfigures the correspondence between the first uplink resource and the second uplink resource.

It should be noted that when a plurality of sets of CG resources are configured for the terminal device to transmit the aperiodic service, there are N CG resources in one CG periodicity, where N is an integer greater than 1. In this case, the access network device may configure one set of PUCCH resources for each CG resource in each CG periodicity, or may configure one set of PUCCH resources in each CG periodicity. The set of PUCCH resources correspond to the N CG resources. If the terminal device does not transmit uplink data through the CG resource, the terminal device automatically ignores the PUCCH resource corresponding to the CG resource and the accompanying PUCCH resource in the CG periodicity.

The foregoing embodiment provides the data transmission method. When transmitting the aperiodic service, when sending the data packet of the aperiodic service on the CG resource, the terminal device further sends the indication information on the PUCCH resource corresponding to the CG resource. As long as the access network device successfully obtains, through parsing, at least one of the first data packet carried on the CG resource and the PUCCH signal corresponding to the first data packet, it can be determined that the terminal device performs transmission through the CG resource in the CG periodicity. This can avoid a case in which the access network device does not realize that packet loss occurs because the access network device mistakenly considers that the terminal device does not send the uplink data, and therefore does not adjust a transmission manner to improve reliability of subsequent transmission. Consequently, packet loss still occurs in a subsequently transmitted data packet, and interruption at an application layer is caused due to survival time timeout.

Figure 6:
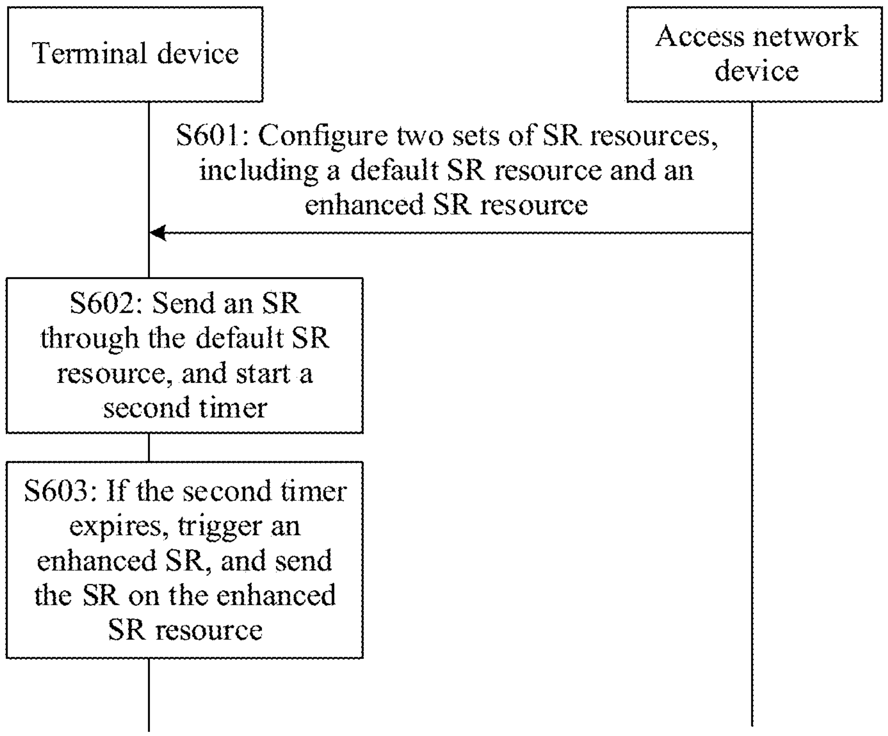

FIG. 6 is a schematic flowchart of a data transmission method according to an embodiment of this application. This embodiment relates to a specific process of data transmission between an access network device and a terminal device. This embodiment may be performed by the access network device and the terminal device, or may be performed by a module, for example, a chip, separately used in the access network device and the terminal device. The following provides description by using an example in which the method is performed by an access network device and a terminal device.

As shown in FIG. 6, the method may include S601, S602, and S603. An execution sequence of the steps is not limited in this embodiment of this application.

S601: An access network device configures a scheduling request (scheduling request, SR) resource for a terminal device. Specifically, the access network device configures two sets of SR resources for one LCH, where one set is a default configuration, and the other set is an enhanced configuration. Optionally, density of the SR resource in the enhanced configuration is higher than that of the SR resource in the default configuration, and/or timing duration of a timer for prohibiting SR transmission sr-ProhibitTimer is shorter.

Optionally, the access network device may alternatively configure an SR resource by using a DRB/LCH as a granularity. In other words, the access network device may configure two sets of SR resources for one DRB/LCH. The following uses an example in which the access network device configures two sets of SR resources for a first LCH for description.

S602: After a service arrives and an SR corresponding to the first LCH is triggered, the terminal device sends the SR through a default SR resource (that is, it may be understood that the default SR is triggered in this case), and starts a second timer (note: the timer in the embodiment shown in FIG. 4 may be referred to as a first timer). Optionally, the service may be an aperiodic service.

S603: When the second timer runs, if the terminal device receives a resource scheduled by the access network device, and the resource can be used to transmit data of the first LCH, or the SR corresponding to the first LCH is canceled, the terminal device stops the second timer.

If the second timer expires, the terminal device cancels the default SR triggered by the first LCH, and triggers an enhanced SR corresponding to the LCH, and the terminal device switches to the enhanced SR resource to continue to send the SR. Alternatively, if the second timer expires, the terminal device does not cancel the default SR corresponding to the first LCH, but additionally triggers the enhanced SR corresponding to the first LCH, and the terminal device sends the SR through both the default SR resource and the enhanced SR resource.

The foregoing embodiment provides the data transmission method. The access network device configures different levels of SR resources for the LCH/DRB of the terminal device. When the aperiodic service arrives, the default SR is first triggered. If receiving no response from the access network device after a specific quantity of times of sending, the terminal device may switch to the enhanced SR resource to continue to send the SR. In this manner, reliability of the SR can be improved, so that the access network device can allocate an uplink resource in a timely manner, to avoid interruption at an application layer caused by a survival time timeout.

For embodiments in FIG. 4 to FIG. 6, the following needs to be noted.

(1) The step numbers of each flowchart described in the foregoing embodiments are merely a procedure execution example, and do not constitute a limitation on a step execution sequence. In embodiments of this application, there is no strict execution sequence between steps having no time sequence dependence relationship with each other. In addition, not all steps shown in each flowchart are necessarily performed steps, and some steps may be added or deleted based on each flowchart according to an actual requirement. It should be understood that performing some steps in the figure or adjusting a sequence of the steps for specific implementation shall fall within the protection scope of this application.

(2) Embodiments in FIG. 4 to FIG. 6 may be implemented independently, or may be combined with each other.

(3) In the foregoing embodiments, some messages and parameters in a 5G communication system are used. However, in specific implementation, different messages or message names may be used, which is not limited in embodiments of this application.

Figure 7:
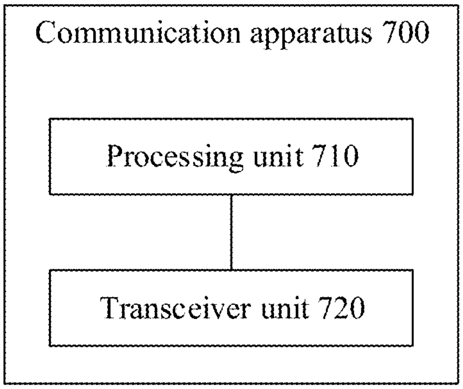
FIG. 7 and FIG. 8 are diagrams of structures of possible communication apparatuses according to an embodiment of this application.
Figure 8:
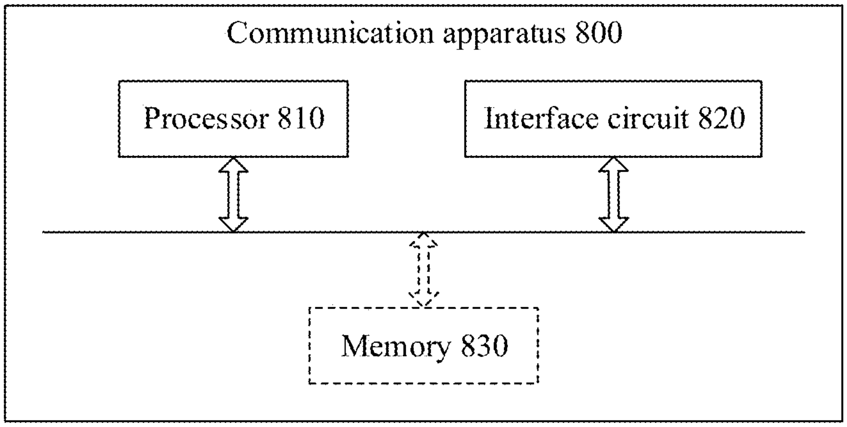

FIG. 7 and FIG. 8 are diagrams of structures of possible communication apparatuses according to an embodiment of this application. As shown in FIG. 7, a communication apparatus 700 includes a processing unit 710 and a transceiver unit 720.

When the communication apparatus 700 is configured to implement the function of the terminal device in the method embodiment shown in FIG. 4, the transceiver unit 720 is configured to send a first data packet to an access network device on a first uplink resource. The processing unit 710 is configured to start a timer and listen to feedback information from the access network device, where the feedback information is used to feed back whether the access network device successfully receives the first data packet. The processing unit 710 is further configured to: if the feedback information or retransmission scheduling information from the access network device is received during running of the timer, stop the timer; or if the timer expires, send first indication information to the access network device, where the first indication information indicates that uplink packet loss occurs in the access network device.

When the communication apparatus 700 is configured to implement the function of the terminal device in the method embodiment shown in FIG. 5, the transceiver unit 720 is configured to send a first data packet to an access network device on a first uplink resource. The transceiver unit 720 is further configured to send second indication information to the access network device on a second uplink resource. There is a correspondence between the first uplink resource and the second uplink resource, and the second indication information indicates that an uplink data packet is transmitted on the first uplink resource.

When the communication apparatus 700 is configured to implement the function of the terminal device in the method embodiment shown in FIG. 5, the processing unit 710 is configured to: after a service arrives and an SR corresponding to a first LCH is triggered, send the SR through a default SR resource, and start a second timer. The processing unit 710 is further configured to: if the second timer expires, cancel the default SR triggered by the first LCH, and trigger an enhanced SR corresponding to the LCH. The sending unit 720 is configured to send the SR through the enhanced SR resource.

FIG. 8 is a diagram of a structure of another possible communication apparatus according to an embodiment of this application. As shown in FIG. 8, a communication apparatus 800 includes a processor 810 and an interface circuit 820. The processor 810 and the interface circuit 820 are coupled to each other. It may be understood that the interface circuit 820 may be a transceiver or an input/output interface. Optionally, the communication apparatus 800 may further include a memory 830, configured to: store instructions executed by the processor 810, or store input data required by the processor 810 to run the instructions, or store data generated after the processor 810 runs the instructions.

When the communication apparatus 800 is configured to implement the method shown in FIG. 4, FIG. 5, or FIG. 6, the processor 810 is configured to implement a function of the processing unit 710, and the interface circuit 820 is configured to implement a function of the transceiver unit 720.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor or the like.

In embodiments of this application, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in a network device or a terminal device.

All or some of the foregoing embodiments may be implemented through software, hardware, firmware, or any combination thereof. When software is used to implement embodiments, all or a part of embodiments may be implemented in a form of a computer program product. The computer program product includes one or more computer programs or instructions. When the computer programs or instructions are loaded and executed on a computer, the procedures or the functions in embodiments of this application are all or partially executed. The computer may be a general-purpose computer, a dedicated computer, a computer network, a network device, a terminal device, or another programmable apparatus. The computer programs or the instructions may be stored in a computer-readable storage medium, or may be transmitted through a computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. Sequence numbers of the foregoing processes do not mean an execution sequence, and the execution sequence of the processes should be determined based on functions and internal logic of the processes.

What is claimed is:

1. A data transmission method, wherein the method is applied to a terminal device or a chip in the terminal device, and the method comprises:

sending a first data packet to an access network device on a first uplink resource;

starting a timer, and listening to feedback information from the access network device, wherein the feedback information is used to feed back whether the first data packet is successfully received;

based on the feedback information or retransmission scheduling information from the access network device being received during running of the timer, stopping the timer;

based on the timer expiring, sending first indication information to the access network device, wherein the first indication information indicates that uplink packet loss occurs in the access network device; and based on the timer expiring, activating a radio link control (RLC) entity corresponding to a second data radio bearer (DRB) to perform packet data convergence protocol (PDCP) replication transmission, wherein the second DRB is a DRB associated with the first uplink resource or a DRB associated with a configuration grant (CG) to which the first uplink resource belongs.

2. The method according to claim 1, wherein the method further comprises:

before starting the timer, determining whether the first data packet comprises data of a first data radio bearer (DRB), wherein when transmitting a data packet of the first DRB, the terminal device needs to start the timer and listen to the feedback information.

3. The method according to claim 1, wherein the first uplink resource is a configuration grant (CG) or a dynamic grant (DG).

4. The method according to claim 1, wherein the feedback information comprises one or more of configuration grant (CG) information, hybrid automatic repeat request (HARQ) process information, and data radio bearer (DRB) information.

5. The method according to claim 1, wherein the first indication information comprises one or more of configuration grant (CG) information, hybrid automatic repeat request (HARQ) process information, and data radio bearer (DRB) information.

6. The method according to claim 1, wherein the first indication information is carried in uplink control information (UCI), and a resource carrying the UCI is a physical uplink control channel (PUCCH) resource associated with the first uplink resource.

7. The method according to claim 1, wherein the RLC entity corresponding to the second DRB is preconfigured.

8. The method according to claim 1, wherein a duration of the timer is preconfigured; and the duration of the timer is configured based on each data radio bearer (DRB);

the duration of the timer is configured based on each logical channel;

the duration of the timer is configured based on each set of configuration grants (CGs);

the duration of the timer is configured based on each bandwidth part (BWP);

the duration of the timer is configured based on each serving cell; or the duration of the timer is configured based on each terminal device.

9. A communication apparatus, comprising a hardware module configured to perform the method according to claim 1.

10. A communication apparatus, comprising a processor and a memory, wherein the processor is coupled to the memory, and the processor is configured to control the apparatus to implement the method according to claim 1.

11. A communication apparatus, comprising a processor and an interface circuit, wherein the interface circuit is configured to receive a signal from a communication apparatus other than the communication apparatus and transmit the signal to the processor or send a signal from the processor to a communication apparatus other than the communication apparatus, and the processor is configured to implement the method according to claim 1 through a logic circuit or by executing code instructions.

12. A computer-readable non-transitory storage medium, wherein the storage medium stores a computer program or instructions, and when the computer program or the instructions are executed by a communication apparatus, the method according to claim 1 is implemented.

* * * * *